United States Patent
Gehrke et al.

(10) Patent No.: US 10,303,145 B2
(45) Date of Patent: May 28, 2019

(54) FLUID SYSTEM AND METHOD FOR OPERATING A FLUID SYSTEM

(71) Applicant: FESTO AG & Co. KG, Esslingen (DE)

(72) Inventors: Martin Gehrke, Weinstadt (DE); Tilmann Bork, Berlin (DE); Helmut Deichert, Waiblingen (DE)

(73) Assignee: FESTO AG & CO. KG, Esslingen (DE)

( * ) Notice: Subject to any disclaimer, the term of this patent is extended or adjusted under 35 U.S.C. 154(b) by 826 days.

(21) Appl. No.: 14/384,998

(22) PCT Filed: Mar. 14, 2013

(86) PCT No.: PCT/EP2013/000762
§ 371 (c)(1),
(2) Date: Sep. 12, 2014

(87) PCT Pub. No.: WO2013/135382
PCT Pub. Date: Sep. 19, 2013

(65) Prior Publication Data
US 2015/0285281 A1 Oct. 8, 2015

(30) Foreign Application Priority Data
Mar. 15, 2012 (DE) .................. 10 2012 005 224

(51) Int. Cl.
*G05B 19/042* (2006.01)
*F15B 19/00* (2006.01)
*F16P 3/14* (2006.01)

(52) U.S. Cl.
CPC .......... *G05B 19/0428* (2013.01); *F15B 19/00* (2013.01); *F15B 19/005* (2013.01);
(Continued)

(58) Field of Classification Search
CPC ....... Y10T 137/87169; Y10T 137/8175; Y10T 137/0324; F16P 3/144; F16P 3/142; G05B 19/0428; F15B 19/005
See application file for complete search history.

(56) References Cited

U.S. PATENT DOCUMENTS 4,278,046 A * 7/1981 Clarke ............... B05B 13/041
                                                              118/323
6,037,857 A * 3/2000 Behrens ............. G05B 19/0423
                                                              307/326
(Continued)

FOREIGN PATENT DOCUMENTS

EP 1061269 12/2000
EP 1266147 8/2001
(Continued)

*Primary Examiner* — Atif H Chaudry
(74) *Attorney, Agent, or Firm* — Hoffmann & Baron, LLP

(57) ABSTRACT

A fluid system for the reliable operation of an actuator controlled by fluid means, including a control device, a valve controller, fluid control valves that are designed to influence fluid flows on at least one actuator, sensors designed to determine a state of the actuator and a monitoring device designed to process the sensor signals and to provide a monitoring signal to the valve controller. The control device is designed in accordance with a first safety category of a safety standard and the valve controller, the fluid control valves, the sensors and the monitoring device are designed in accordance with a second safety category of the safety standard, wherein said second safety category is positioned at a higher level than the first safety category within the safety standard.

9 Claims, 2 Drawing Sheets

(52) U.S. Cl.
CPC .............. *F16P 3/142* (2013.01); *F16P 3/144* (2013.01); *Y10T 137/0324* (2015.04); *Y10T 137/7722* (2015.04); *Y10T 137/8175* (2015.04); *Y10T 137/87169* (2015.04)

(56) References Cited

U.S. PATENT DOCUMENTS

| | | | | |
|---|---|---|---|---|
| 6,581,619 | B1* | 6/2003 | Christiani | F15B 21/00 137/14 |
| 6,769,250 | B2* | 8/2004 | Fuss | F15B 19/005 60/403 |
| 8,365,762 | B1* | 2/2013 | Trotter | B64D 1/18 137/485 |
| 2009/0045361 | A1* | 2/2009 | Nolle | F15B 13/086 251/12 |
| 2013/0321636 | A1* | 12/2013 | Matsudo | H04N 7/18 348/152 |

FOREIGN PATENT DOCUMENTS

| | | |
|---|---|---|
| WO | WO01/59307 | 8/2001 |
| WO | WO2005/111433 | 11/2005 |

\* cited by examiner

FLUID SYSTEM AND METHOD FOR OPERATING A FLUID SYSTEM

This application claims priority based on an International Application filed under the Patent Cooperation Treaty, PCT/EP2013/000762, filed Mar. 14, 2013, which claims priority to DE102012005224.3, filed on Mar. 15, 2012.

BACKGROUND OF THE INVENTION

The invention relates to a fluid system for the safe operation of a fluid-operable actuator, comprising a control device for the provision of control signals to a valve controller, a valve controller for the operation of fluid control valves, fluid control valves which are electrically connected to the valve controller and designed to influence fluid flows to at least one actuator, sensor means which are designed to detect an actuator state, in particular an actuator position, and to output sensor signals in accordance with the detected actuator state, and a monitoring device which is designed to process the sensor signals and to provide a monitoring signal to the valve controller.

From EP1061269 A2, there is known a fault detection device for detecting a malfunction of actuating drives; this comprises an actuator having a movable piston, a servovalve connected thereto by hydraulic lines, a fault detection device and an electronic control unit for outputting a set value to the control unit of the servovalve. In this publication, it is provided that the control position of the servovalve determines the direction and speed of the piston movement, wherein a first sensor is provided for detecting the control position of the servovalve and a second sensor is provided for detecting the position of the piston in the actuator housing, and wherein the control position and the piston position are transmitted to the control electronics. The fault detection device is connected to the sensors, the actual speed and direction of the actuator piston being determined from the signals of the second sensor, wherein a set value for the speed and direction of the actuator piston is determined from the set value for the control position of the servovalve for fault detection, and wherein these are related to the speed and direction of the actuator piston determined from the signals of the second sensor and a fault signal is output if any deviation exceeds a threshold value.

EP1266147 A1 discloses a fluid power system with a safety function for the safety-oriented control of at least one fluid power actuator, the system comprising at least one local control device for the control of the fluid power actuator via control means of the fluid power system, wherein at least one sensor is provided for transmitting at least one information on at least one operating state of the fluid power system to the local control device, and wherein the local control device is designed such that it can evaluate at least one information for determining at least one safety-critical state and that it takes a predetermined consequential action if the at least one safety-critical state is present.

SUMMARY OF THE INVENTION

The invention is based on the problem of providing a fluid system and a method for operating a fluid system which offer an advantageous compromise between meeting stringent safety requirements and uninterrupted operation.

For a fluid system of the type referred to above, this problem is solved by the features of claim 1. In this, it is provided that the control device is designed in accordance with a first safety category of a safety standard and the valve controller, the fluid control valves, the sensor means and the monitoring device form a safe working system and are designed in accordance with a second safety category of the safety standard, wherein the second safety category is positioned at a higher level than the first safety category within the safety standard.

Examples for available safety standards are national or international standards in which, for example, requirements relating to reliability and/or a predefined behaviour of the respective components in fault conditions are defined and in which the operational reliability or failsafe design of the components is usually assigned to clearly distinguishable safety classes of categories. A component which is to be allocated to a specific safety category of a safety standard typically has to be examined by the manufacturer and/or by an independent testing facility for meeting all of the requirements of the respective safety category, and it may also have to be certified.

Designing components of a fluid system in accordance with the requirements of the safety category aimed at can involve considerable effort and costs in the design process, the manufacturing process and, if applicable, in the integration of the components into the respective operating system, thereby affecting the manufacturing costs for the fluid system concerned. It is therefore expedient to design as few components of the fluid system in accordance with a high safety category of a safety standard, while the remaining components of the fluid system are designed in accordance with lower safety categories. In practical applications, this may for example mean that the components which are to be allocated to the higher safety category have a lower probability of failure than the components which are to be allocated to the lower safety category.

According to the invention, the system limit for the safe working system is drawn tightly around the group of components of the fluid system which are designed in accordance with a common high safety category, in order to reduce the number of components in the safe working system and thus the costs of the safe working system to a minimum.

According to the invention, the control device which controls the sequences within the fluid system in an open loop and perhaps at least partially in a closed loop and which has a complex structure is not a part of the safe working system, because any design of a control device in accordance with a higher safety category involves a considerable additional effort and higher costs. On the contrary, in the fluid system according to the invention, only those components which are directly responsible for influencing the fluid supply to the actuator or for monitoring the components required for the fluid supply, i.e. the monitoring device in particular, are allocated to a higher safety category than the control device.

With the aid of the safe working system, which comprises the components valve controller, fluid control valves, sensor means and monitoring device, an actuator designed as a fluidic operating cylinder can be controlled safely and reliably while being monitored. In an exemplary operating mode for the operating cylinder, in which it is, for example, switched by the application of pressurised fluid between an extended position for the piston rod and a retracted position for the piston rod, the sensor means are designed as limit switches, each of which outputs a sensor signal when the piston rod of the actuator has reached one of the two preset end positions. If there is no sensor signal in response to the provision of fluidic energy to the actuator, or if both sensor means simultaneously output sensor signals, the monitoring device transmits a monitoring signal to the valve controller in view of an assumed fault. The valve controller then controls the fluid control valves in such a way that the actuator and the machine elements motion-coupled thereto can be brought into a safe state as quickly as possible. The safe state aimed at usually is a fast deceleration and a stop of the actuator, in order to minimise any damage to the fluid system and the machine into which the fluid system is integrated, and possibly to minimise a risk of injury by the actuator and the machine elements motion-coupled thereto for the operator of the machine.

Advantageous further developments of the invention form the subject matter of the dependent claims.

It is expedient if the working system and the control device are designed in accordance with the safety categories of one or more of the safety standards IEC 61508, IEC 61511, IEC 62061, IEC 13849.

In an advantageous further development of the invention, it is provided that the monitoring device is electrically connected to a safety switching means and designed to include a safety signal of the safety switching means in the monitoring signal, the safety switching means being designed to limit and/or monitor access to a hazard area defined by the actuator, being in particular an light-beam barrier or a pressure mat or a door contact of a service door in a safety cage. The purpose of such a safety switching means is a shutdown of the fluid system and thus of any actuator which may be integrated into a machine if a user interferes with or enters the hazard area defined by the actuator.

The monitoring device is preferably electrically connected to an operator switching means and/or to a safety circuit and designed to include an operator signal of the operator switching means and/or an enable signal of the safety circuit into the monitoring signal, the operator switching means being designed as a selector for an operating mode of the fluid system and the safety circuit being designed as a monitoring system for the fluid system. By way of example, it may be provided that the fluid system for the actuator can, using the operator switching means, be moved from an operative state into an inoperative state or from an inoperative state into an operative state. When switching the fluid system from the operative into the inoperative state, it may be provided that the operator switching means provides an operating signal corresponding to the operator's wish to the monitoring device and that the monitoring device, in response to this operating signal, outputs a corresponding monitoring signal to the valve controller. The valve controller is preferably designed such that it can perform a situation-dependent shutdown of the fluid system. If the valve controller receives a monitoring signal based on an operating signal with which the user aims to shut down the machine, for example for maintenance work, it may be provided that the fluid supply is influenced only after the actuator has reached a preferred position, from which the machine can be restarted without any additional effort. If, however, the valve controller receives a monitoring signal which is related to a malfunction of the sensor means or which comes from an operator switching means represented by an emergency stop switch, the movement of the actuator has to be interrupted as quickly as possible, and it has to be brought to a stop very fast, resulting in an immediate effect on the fluid control valves and the fluid flows to the actuator which are controlled by the fluid control valves. In addition or as an alternative, the monitoring device can be connected to a safety circuit which is designed to assess a hazard potential of the fluid system and which outputs an enable signal if the hazard potential of the fluid system is below a presettable limit value. This enable signal is included by the monitoring device in case an intervention of a user in the hazard area determined by the actuator does not result in a transmission of a monitoring signal at least if there is no current and/or immediately intended actuator movement. This avoids the risk that the fluid system could, possibly in response to a corresponding monitoring signal, be transferred needlessly into a safe state, from which a return to a normal state could involve major effort.

In an advantageous further development of the invention, it is provided that the valve controller or the safe working system is designed to operate the fluid control valves in such a way that fluid flows to the at least one actuator are influenced such that the actuator can, within a presettable time, be brought into at least one presettable functional state from the group: actuator non-pressurised; fluid flows from and/or to actuator stopped; direction of movement for actuator preset; actuator controlled to standstill; actuator controlled to preset force; pressure in actuator limited without control; actuator clamp activated; speed of actuator movement limited. In this respect, the valve controller and the safe working system can be designed such that they can effect only a part of these functional states or all of them; if applicable, this can be preset by the user by suitable parameterisation or programming of the valve controller or the safe working system or by a suitable operation of the valve structure. In this context, the valve controller and/or the safe working system can be configured such that they establish a respective functional state corresponding to a stored model in response to a monitoring signal of the monitoring system and/or to an operating signal of an operator switching means and/or to an enable signal of a safety circuit. The operation of the suitable functional state can, for example, depend on whether the presence of a more or less critical operating state for the fluid system can be determined from the monitoring signals, the enable signals or the operating signals, in order to take suitable steps for catching a fault with as few consequences as possible, depending on the severity of the fault.

The functional state "actuator non-pressurised" is a basic state for the actuator and means that pressure is no longer applied to the actuator. In view of a disconnection of an electric drive from an electric supply voltage, this state is described as "safe torque off" or "STO".

The functional state "fluid flows from and/or to actuator stopped" is a basic state for the actuator and means that the actuator comes to a standstill within a preset time. Provided that the actuator is constructed accordingly, it is provided that, by closing the fluid control valves in the actuator, at least one fluid quantity and preferable all fluid quantities is/are entrapped, so that the movement of the actuator is stopped and the actuator maintains a position of standstill. This is, for example, the case in a fluid cylinder having two separate working chambers sealed in a fluid-tight manner by the fluid control valves. This state is also described as "safe operation stop" or "SOS".

The functional state "direction of movement preset" is a basic state for the actuator and means that a fluid supply to the actuator is provided or maintained in such a way that the actuator performs an actuating movement in a preset actuating direction, for example a withdrawal or release movement which may be useful in a clamping device driven by the actuator in order to avoid the risk of an accident. In fluid cylinders with two separate working chambers sealed fluid-tight by the fluid control valves, for example, a fluid supply into one of the working chambers is established or continued for adopting the functional state "direction of movement preset", while the fluid is discharged from the second working chamber by means of the associated fluid control valves. The pressure differential resulting therefrom causes a defined presetting of the direction of movement. This functional state is also described as "safe direction" or "SDI".

The functional state "actuator controlled to standstill" is an optional functional state and means that the actuator adopts and maintains a presettable position. It may for example, be provided that the actuator is decelerated from a movement for this purpose and, on reaching standstill, is held in the standstill position. Alternatively, it may be provided that the actuator is traversed from standstill or from a movement into a presettable position. This functional state is also described as "safe balanced torque" or "SBT". If this functional state cannot be established within a presettable time, the actuator is moved into one of the basic states, in particular into the functional state "actuator non-pressurised".

The functional state "actuator controlled to preset force" is an optional functional state and means that the pressure in at least one working chamber of the actuator is controlled in such a way that the actuator can deliver a force limited to a presettable level or a presettable torque. This functional state is also described as "safe limited torque" or "SLT". This functional state is relevant, for example, if the actuator is used for moving a gripper or a clamping device and has to be secured in a fault condition, so that an object gripped or clamped at that point in time is not released, as would, for example, be the case in the functional state "actuator non-pressurised". If the functional state "actuator controlled to preset force" cannot be established within a presettable time, the actuator is moved into one of the basic states, in particular into the functional state "fluid flows from and/or to actuator stopped".

The functional state "pressure in actuator limited without control" is an optional functional state and means that the actuator is pressurised to a preset pressure value which is, however, not monitored for deviations, and there is no tracking of the pressurisation. This functional state is also described as "safe torque range" or "SLR". If this functional state cannot be established within a presettable time, the actuator is moved into one of the basic states, in particular into the functional state "actuator non-pressurised".

The functional state "actuator clamp activated" is an optional functional state and means that a clamping arrangement assigned to the actuator, such as a brake operated by spring force and released pneumatically or electromechanically, is activated in order to decelerate a movement of the actuator and/or to hold a stopped actuator in its standstill position. This functional state complements the basic state "actuator non-pressurised".

The functional state "speed of actuator movement limited" is an optional functional state and means that the actuator starts or continues a speed-limited movement in response to a suitable operation of the fluid control valves. This functional state is also described as "safe limited speed" or "SLS". If this functional state cannot be established within a presettable time, the actuator is moved into one of the basic states, in particular into the functional state "actuator non-pressurised".

In a further development of the invention, it is provided that the valve controller or the safe working system is configured to predetermine a time sequence of at least two functional states. By means of this arrangement, the actuator can be made to perform or continue a movement and then be arrested, for example on reaching a presettable position.

In a first variant, which is also described as "safe stop"/ type 1 or "SS1", the actuator is first moved into the functional state "fluid flows from and/or to actuator stopped" or "SOS", until the actuator comes to a standstill, followed by a further step, i.e. the transfer of the actuator into the functional state "actuator non-pressurised" or "SOS".

In a second variant, which is also described as "safe end position" or "SEP", the actuator is first moved into the functional state "direction of movement preset" or "SDI" until it has reached its end position, followed by a further step, i.e. the transfer of the actuator into the functional state "actuator non-pressurised" or "STO".

In a third variant, which is also described as "safe retracting" or "SRT", the actuator is first moved into the functional state "direction of movement preset" or "SDI" until it has reached a retraction position, followed by a further step, i.e. the transfer of the actuator into the functional state "fluid flows from and/or to actuator stopped" or "SOS".

It is advantageous if the control device is electrically connected to the safety switching means and/or to the operator switching means and designed to include a signal of the safety switching means and/or of the operator switching means in the generation of control commands to working valves connected to the actuator and/or to the valve controller. In this way, the control device gains information on any intervention by the safety switching means. In addition, an intervention by the monitoring device and the valve controller, which could possibly result in stopping the actuator in an unfavourable position, is avoided, depending on the working situation of the fluid system and the actuator. This intervention by the monitoring device and the valve controller is preferably prevented by providing that the signals of the safety switching means and/or of the operator switching means are already taken into account in the generation of control commands by the control device, with the result that the actuator is possibly not operated at all or only at a later time, even if its operation is specified in accordance with a programme stored in the control device. In this context, it is particularly important that the control device may be provided for the operation of several actuators and that, if a signal of the safety switching means and/or of the operator switching means is present, further movement sequences of the actuators can be interrupted in a coordinated way.

In a preferred variant, the fluid control valves are, for a fluid control of the actuator, looped as switching valves between a fluid source and the actuator, or looped in, upstream or downstream of working valves operable by the control device, as stop valves between the fluid source and the actuator, in order to ensure an actuating movement of a control element of the actuator into a presettable switching position or a holding of the control element of the actuator in the presettable switching position.

In a first embodiment, it is provided that fluid control valves for influencing the fluid flows to the actuator during the operating state are exclusively provided and are, in accordance with the instructions of the control device and the downstream valve controller, switched between different functional positions, in particular between an open position and a closed position, or adjusted proportionally to the control signals of the valve controller. As the fluid control valves of this embodiment complete during the normal operating state of the fluid system a large number of load cycles, i.e. switching operations between individual functional positions, and as they have a defined, passive preferred position, their design has to meet stringent requirements in order to comply to the safety category demanded for the safe working system. Depending on their application, the fluid control valves may be switching valves, parallel- or series-connected arrangements of switching valves with identical or preferably different flow resistances or proportional valves.

In a second, alternative embodiment, it is provided that the fluid control valves are used as stop valves which are looped in fluid lines between a fluid source and the actuator in addition to working valves operated by the control device, possibly with the interposition of a working valve controller. In a malfunction and/or in an emergency, the fluid control valves in this case block the respective fluid line after the transmission of a monitoring signal from the monitoring device to the valve controller. This embodiment offers several advantages. On the one hand, each fluid line connected to the actuator contains at least two valves, i.e. in particular the working valve and the fluid control valve, so that the redundancy which is required in case of a malfunction/emergency is provided for the interruption of the fluid flow through the respective fluid line. In addition, these valves looped into the fluid lines of different pieces of equipment are operated by the control device and the valve controller, providing redundancy in terms of control technology as well. Furthermore, the fluid control valves serving as stop valves for emergencies have to complete only a small number of load cycles with the required reliability and can therefore be assigned to the same safety category as the other components of the safe working system with less design effort and at lower costs then in the case of the first embodiment described above.

In a further development of the invention, it is provided that the fluid control valves are fluidically connected to the actuator and that the sensor means are assigned to the actuator, the actuator being designed for a provision of an actuating movement, in particular a linear and/or rotary switching movement, between a first and a second switching position.

The control device is preferably designed for a bidirectional communication, in particular via a field bus system, with a higher-order machine or process control system allocated to an identical or lower or higher safety category than the control device. The machine or process control system is designed for the coordination of several control devices and communicates with the control devices via a field bus system.

According to a second aspect, the problem of the invention is solved by a method for operating a fluid system, wherein the following steps are provided: the determination of the actuator state using the sensor means and the outputting of control signals corresponding to the determined actuator state to the monitoring device, the processing of the sensor signals in the monitoring device and the provision of a monitoring signal to the valve controller if no sensor signals are provided by the sensor means or if incorrect sensor signals are provided by the sensor means, the processing of the monitoring signal in the valve controller, in particular as a function of the detected sensor signals, and the operation of the fluid control valves for influencing at least one fluid flow to the actuator, so that the actuator adopts and/or maintains a presettable safe state. In a kind of basic functionality of the fluid system, at least those faults which are based on a malfunction of the sensor means or a malfunction of the actuator are detected in this way. A malfunction of the sensor means is assumed if the monitoring device receives from the sensor means sensor signals which are not plausible, for example a simultaneous input of sensor signals of two end position sensors arranged at a distance from one another. A malfunction of the sensor means and/or of the actuator is assumed if there is no change in the sensor signals after the provision of fluidic energy to the actuator within a presettable time, or if there is no further change in the sensor signals within a presettable time following their initial change, which would normally indicate the arrival of the actuator in a preset position. For these faults, it is provided that no further fluidic energy is made available to the actuator or that a fluid flow to the actuator is interrupted in order to enable it to either maintain or adopt a safe state.

In a variant of the method, it is provided that the monitoring device monitors electric signals of the safety switching means and, if there is an intervention into or an access to a hazard area defined by the actuator, sends a corresponding monitoring signal to the valve controller in order to operate the fluid control valves in such a way that at least one fluid flow to the actuator is influenced, causing the actor to adopt or maintain a presettable safe state. In this way, a hazard area defined by the actuator, for example a pivoting range or a linear adjustment range of a machine element which is motion-coupled to the actuator, can be secured by means of safety switching means such as light-beam barriers or pressure mats. If a user or an object enters or approaches the secured hazard area, the supply of fluidic energy to the actuator is interrupted by the electric signals of the safety switching means triggered by this event. An active clamping of the actuator can be provided in addition, it required.

In a further variant of the method, it is provided that the monitoring device, if detecting an intervention into or an access to a hazard area defined by the actuator, only sends a corresponding monitoring signal to the valve controller using the signal of the safety switching means, if an imminent state change of the actuator is detected from the output of a control signal of the control device and/or the valve controller, and/or if a state change of the actuator is detected from at least one change of a sensor signal from at least one sensor means. In fluid systems in which the actuator is only in motion temporarily, an interruption of the working state is avoided at least if the intervention or access by the user is imminent or happens at a time in which no actuator movement is immediately imminent, i.e. within a presettable time interval. In this way, it is possible to avoid the risk that a machine into which the fluid system with the actuator is integrated is, by a corresponding operation of the fluid control valves, unnecessarily brought into a safe state from which it can possibly be recovered into its operative state only with difficulties, such as loss of time in the production sequence and/or losses in material flow. In order to facilitate this function of the fluid system, at least a unidirectional communication from the control device to the monitoring device, or else a bidirectional communication between the monitoring device and the valve controller is provided. In each case, the monitoring device is designed such that it can draw conclusions about a movement of the actuator from the control signals for the working valves and/or for the fluid control valves and only outputs a monitoring signal to the valve unit for operating the fluid control valves, thereby blocking the actuator, if an actuator movement coincides with a signal of the safety switching means which indicates a user intervention in and/or access to the hazard zone.

In a further variant of the method, it is provided that the monitoring device ceases the provision of the monitoring signal as soon as an intervention in and/or access to a hazard area defined by the actuator is no longer detected, and that the valve controller, if no monitoring signal is present, does not operate the fluid control valves in a way which deviates from that specified by the control device. This also prevents an undesirable interruption of the operative state of the fluid system.

In a further variant of the method, it is provided that the valve controller operates the fluid control valves in such a way that at least one working chamber in the actuator continues to be supplied with pressurised fluid in the presence of a corresponding monitoring signal. Depending on the type and design of the actuator, this enables the actuator to reach an advantageous, safe non-operative state from which it can be returned into the operative state without any problems, in particular very quickly and using little energy. An actuator designed as a fluid cylinder, for example, can, in the presence of a monitoring signal and the resulting instruction, adopt a motionless state very quickly and be vented completely, or in a double-acting fluid cylinder at least one of the working chambers or both can remain pressurised. As a result, the actuator can move into a safe position even if the fluid supply is interrupted for reasons not stated in detail. When restarting the fluid system, a movement of the actuator can preferably be initiated solely by venting one working chamber, without necessarily requiring a fluid supply to the actuator.

In a further variant of the method, it is provided that the monitoring device monitors electric signals of an operator switching means and adapts the monitoring signal for the valve controller as a function of the detected signal of the operator switching means. The operator switching means may either be a selector for an operating mode of the fluid system, for example for the operation of an operative state, a service state and an inoperative state, or it may be an emergency stop switch which, if operated by the user, is intended to stop the actuator and the fluid system coupled thereto as fast as possible. If the operator switching means is designed as a selector, the monitoring device can be configured in such a way that the operating state of the fluid system selected by the user is set at the next advantageous point in time, for example after the completion of a work cycle supported by the fluid system. For this purpose, the monitoring device can, in particular within a bidirectional communication with the control device, first analyse the steps yet to be completed to the end of the work cycle and then, at the appropriate time, output a monitoring signal to the control device and to the valve controller, if applicable, in order to prevent a renewed start of a further work cycle following the completion of the present work cycle until the user issues suitable instructions at the operator switching means. If the operator switching means is designed as an emergency stop switch, the control device and/or the valve controller will stop the actuator as quickly as possible in the presence of a corresponding operator signal.

In a further variant of the method, it is provided that control signals of the valve controller for the operation of fluid control valves and sensor signals of the sensor means detected at the actuator are processed in the monitoring device in order to facilitate a check of the safe working system. In this process, the monitoring device performs plausibility checks for various control signals of the valve controller and for the sensor signals of the sensor means, in order to detect any malfunction of these components of the safe working system and to initiate a safe shutdown of the fluid system if any malfunction is detected.

In a further variant of the method, it is provided that, in order to reach the safe state, the valve controller or the safe working system operates the fluid control valves in such a way that fluid flows to the at least one actuator are influenced in such a way that the actuator is, within a presettable time, brought into at least one presettable functional state from the group: actuator non-pressurised; fluid flows from and/or to actuator stopped; direction of movement for actuator preset; actuator controlled to standstill; actuator controlled to preset force; pressure in actuator limited without control; actuator clamp activated; speed of actuator movement limited. The functionality for the valve controller or the safe working system covers both the so-called "basic states" and optional functional states, so that, if a fault occurs, it can first be attempted to bring the actuator in question into an optional functional state in order to avoid any consequential damage to the machinery equipped with the fluid system and/or to the workpiece influenced by the actuator and/or to the operator of the machinery: such damage could result from an immediate shutdown of the fluid system.

In a further variant of the method, it is provided that a time sequence of at least two functional states is preset by the valve controller or by the safe working system.

BRIEF DESCRIPTION OF THE DRAWINGS

An advantageous embodiment of the invention is illustrated in the drawing, of which.

DETAILED DESCRIPTION OF THE PREFERRED EMBODIMENTS

Figure 1:
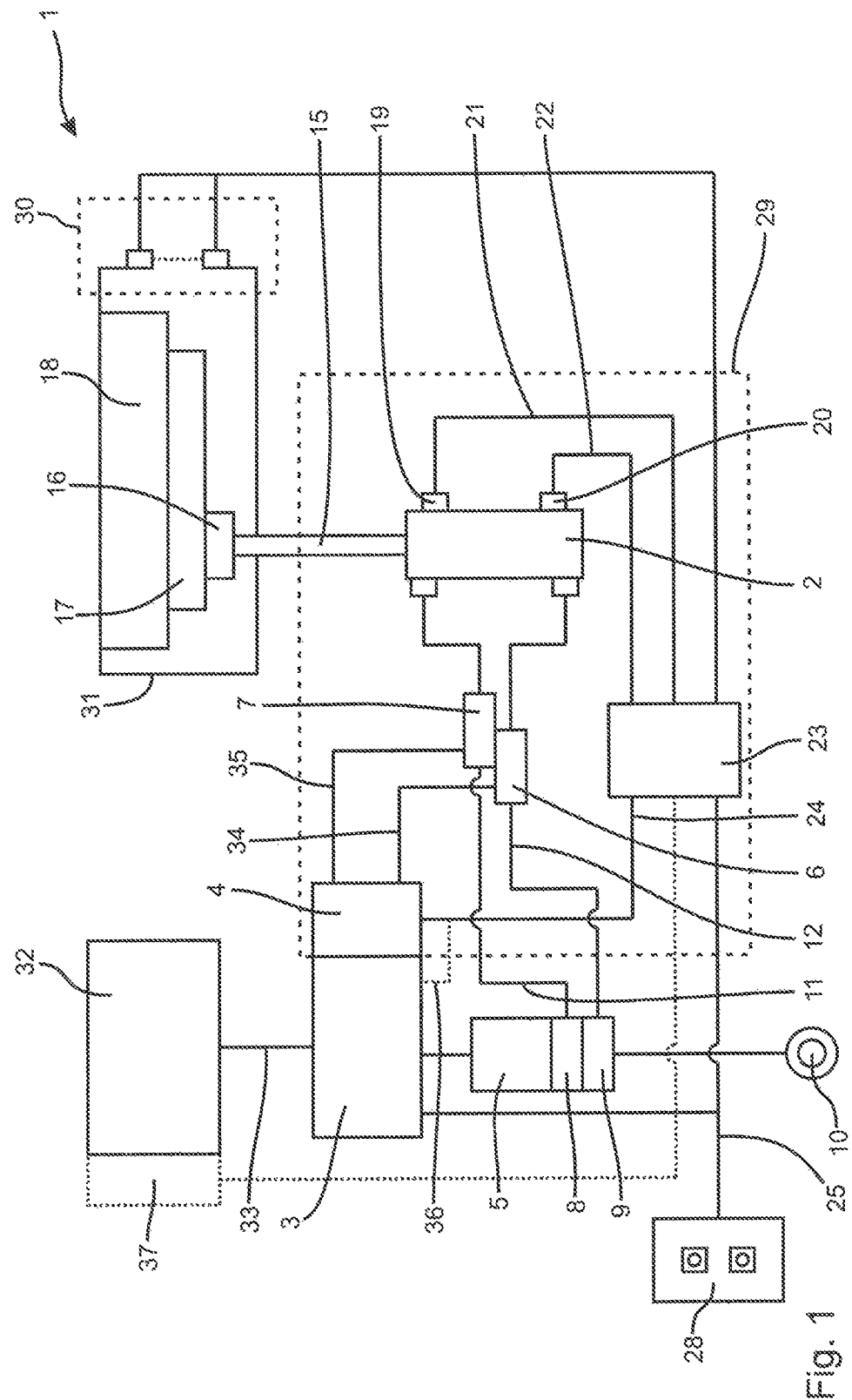
FIG. 1 is a diagrammatic representation of a first embodiment of a fluid system for a machine, which comprises a safe working system.

FIG. 1 shows a first embodiment of a fluid system 1, which forms a part of a machine not shown in detail and which is designed for the safe operation of a fluid-operable actuator 2.

The fluid system 1 comprises a control device 3 designed to provide control signals to a valve controller 4 and to a working valve controller 5. The valve controller 4 is designed for the operation of fluid control valves 6, 7. The working valve controller 5 is designed for the operation of working valves 8, 9. In the illustrated embodiment, it is provided that the working valves 8, 9 are coupled to a fluid source 10 and, via fluid lines 11, 12, to the actuator 2. In accordance with this, the working valves 8, 9 are designed to influence fluid flows between the fluid source 10 and the working chambers of the actuator 2, which are not shown in detail and of which two are provided in the illustrated embodiment. Depending on the provision of pressurised fluid to one or both of the working chambers of the actuator 2, a piston rod 15 of the actuator 2, which is designed as a control element in the illustrated embodiment, can be moved along a linear track between two end positions not shown on detail or, if required, arrested in an intermediate position between the two end positions. In the illustrated embodiment, the end of the piston rod 15 is provided with a plunger 16, by which a workpiece 17 can be located at a table 18 in order to perform operations not shown in detail on the workpiece 17. In the illustrated embodiment according to FIG. 1, the two fluid control valves 6, 7 are looped into the fluid lines 11, 12 as stop valves and can individually block a fluid flow into the respective fluid line if instructed by the valve controller. In this way, any movement of the piston rod 15 of the actuator 2 can be stopped quickly.

The actuator 2 is in the present case provided with two sensor means 19, 20, which in the illustrated embodiment are represented by limit switches, in particular Hall sensors, and each of which outputs a sensor signal via a sensor line 21, 22 to a monitoring device 23 if the piston of the actuator 2, which is not shown in detail, and the piston rod 15 are in one of their two end positions.

The monitoring device 23 is connected to the valve controller 4 via a signal line 24 and to an operator switching means 28 designed as a selector of an operating mode of the fluid system 1 by a signal line 25. Via the signal line 24, the monitoring device 23 can make a monitoring signal available to the valve controller 4. Via the signal line 25, an operation signal can be provided to the monitoring device 23 by the operator switching means 28.

The control device 3, the working valve controller 5 and the working valves 8, 9 are in the present case designed in accordance with a first safety category of a safety standard. The valve controller 4, the fluid control valves 6, 7, the sensor means 19, 20 and the monitoring device 23 form a safe working system 29 designed in accordance with a second safety category of the safety standard. In this context, it is provided that the second safety category of the safe working system 29 is at a higher level within the safety standard than the first safety category, which is applied to the control device 3, the working valve controller 5 and the working valves 8, 9. The safe working system 29 is therefore less likely to fail than the control device 3.

The monitoring device 23 is further coupled to a safety switching means in the form of an light-beam barrier 30 which is provided to secure a hazard area 31 defined by the actuator 2, the piston rod 15 and the plunger 16 mounted thereon as well as the table 18. The light-beam barrier 30 is designed such that, at least if a user not shown in the drawing or a workpiece 17 breaks the light-beam barrier 30 during the operation of the fluid system 1, it outputs a signal which can be processed by the monitoring device 23 and which possibly results in the shutdown of the actuator 2. In this way, the light-beam barrier 30 serves as an access limiting device in the form of an access monitor.

In a regular, trouble-free working state of the fluid system 1 and the machine equipped therewith, it is provided that the control device 3 outputs control signals to the working valve controller 5 for a programmed operation of the working valves 8, 9.

In this context, it may be provided that the control device 3 generates the control signals independently, i.e. without requiring any control commands from a higher-order machine controller 32, possibly even without being connected to the machine controller 32. Alternatively, the control device 3 can generate control signals with the inclusion of control commands of the machine controller 32, to which the control device 3 is connected via a bus system 33 facilitating a bidirectional data exchange.

As a result of the provision of the control signals to the working valve controller 5, the working valves 8, 9 are operated, causing an application of pressurised fluid to at least one of the fluid lines 11, 12. The pressurised fluid is provided by the fluid source 10. As a function of the application of pressure to the fluid lines 11, 12, the piston rod 15 of the actuator 2 of the illustrated embodiment performs an actuating movement between two end positions, in each of which the associated sensor means 19, 20 can transmit a sensor signal via the sensor lines 21, 22 to the monitoring device as soon as the piston of the actuator 2, which is not shown in the drawing and which is connected to the piston rod 15, has reached the respective end position.

If no monitoring signal as provided by the monitoring device 23 is present, the valve controller 4, which is connected to the fluid control valves 6, 7, the control device 3 and the monitoring device 23, provides the monitoring device 23 only with the control signals made available by the control device 3. A operation of the two fluid control valves 6, 7 by the valve controller 4 can be provided if the fluid control valves 6, 7 are, as in the illustrated embodiment, designed as normally closed (NC) valves and neither of the fluid flows through the fluid lines 11, 12 is to be influenced, in particular blocked, by the fluid control valves 6, 7. In this case, a blocking action of the fluid control valves 6, 7 is obtained simply by discontinuing the operation, as a result of which the fluid control valves 6, 7 moves into the blocking position.

Aware of the control signals of the control device 3, the monitoring device 23 checks whether the piston rod 15 of the actuator 2 moves in accordance with the control signals provided. For this purpose, the monitoring device 23 checks whether the sensor signals of the two sensor means 19, 20 change within presettable time intervals in the way to be expected on the basis of the control signals. The monitoring device 23 further checks whether the infra-red barrier 30 outputs a signal which indicates an interruption of the infra-red barrier 30 by a user or a workpiece 17. If the sensor signals of the sensor means 19, 20 change within the presettable time intervals and there is no signal from the infra-red barrier 30, the monitoring device 23 detects a regular operation of the fluid system 1 and outputs either no monitoring signal or a monitoring signal indicating the regular operation of the fluid system 1 to the valve controller 4.

If the monitoring device 23 detects, on the basis of the sensor signals of the sensor means 19, 20 and/or on the basis of a signal of the infra-red barrier 30, that there is either a malfunction in the movement of the actuator 2 and/or a malfunction of the sensor means 19, 30 and/or a break in the infra-red barrier 30, the monitoring device 23 can output a monitoring signal to the valve controller 4, which indicates that there is an irregularity in the operation of the fluid system 1. In this context, the monitoring device 23 can be configured such that it immediately outputs such a monitoring signal to the valve controller 4 if there are any irregularities in the fluid system 1. Alternatively, the monitoring device 23 can be configured such that that it outputs a monitoring signal to the valve controller 4 only if, at the time of the detection of an irregularity by the monitoring device 23, there is either a movement of the actuator 2 or a movement of the actuator 2 within a presettable time interval.

If a monitoring signal arrives in the valve controller 4, the valve controller 4 can provide shutdown commands to the fluid control valves 6, 7 via control lines 34, 35. Immediately following the arrival of the respective shutdown command, the fluid control valves 6, 7 block the respective fluid line 11, 12. Optionally, in particular as a function of the operating mode of the actuator 2, either a complete blocking of the fluid lines 11, 12 can be provided, or else only one of the fluid lines 11 or 12 is blocked. Alternatively, the fluid lines 11, 12 are blocked partially, resulting in limiting the force of the actuator. The at least partial blocking action of the fluid control valves 6, 7 is provided in order to change a state of movement of the actuator 2 as fast and as safely as possible, for example to reduce the risk of injury to a user intervening in the hazard area 31 by the actuator 2 and the components 16, 18 actively connected thereto.

In a preferred embodiment of the invention, it is provided that the monitoring signal is provided by the monitoring device 23 to the valve controller 4 and to the control device 3 in parallel, as illustrated by the additional line branch 36 in FIG. 1. In this context, it may be provided that, on the occurrence of irregularities in the fluid system 1 and a corresponding output of a monitoring signal by the monitoring device 23, control signals which are intended to serve as a reverse reaction to the detected irregularity and which are transmitted to the working valves 8, 9 via the working valve controller 5 in order to effect, for example, a fast interruption of a movement of the actuator 2 are first generated in the control device 3. Only if the monitoring device 23 detects, irrespective of corresponding control signals from the control device 3 to the working valves 8, 9, that the movement state of the actuator 2 has not changed as required, a modified monitoring signal is output, which is now directed to the valve controller 4 and which then results in blocking at least one of the fluid lines 11, 12.

In the embodiment of the fluid system 1 as shown in FIG. 1, the fluid control valves 6, 7 are therefore exclusively used to change the flow behaviour, in particular to block the fluid lines 11, 12, and this happens only if the monitoring device 23 detects any irregularities in the operation of the fluid system 1.

Figure 2:
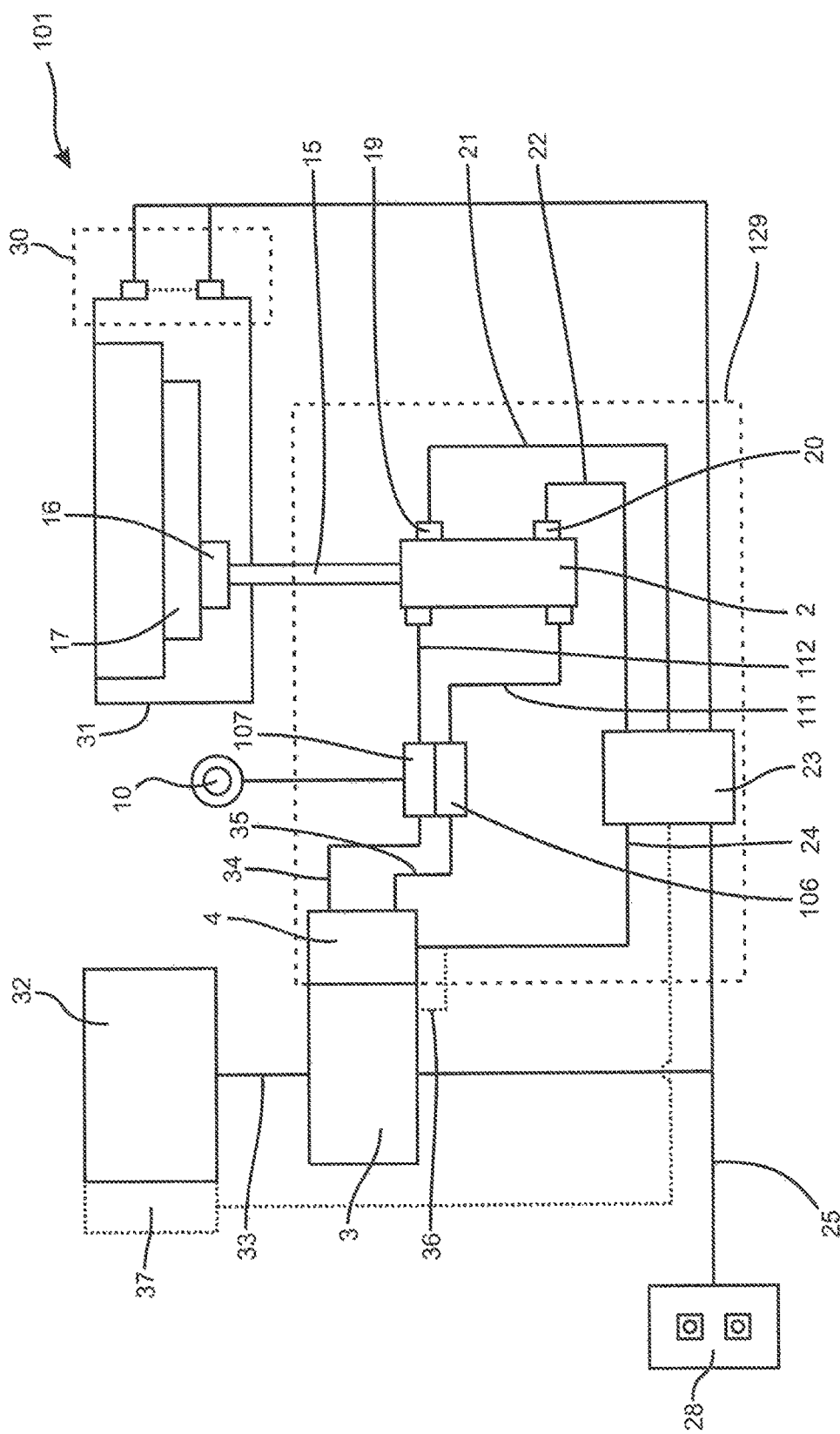
FIG. 2 is a diagrammatic representation of a second embodiment of a fluid system for a machine, which comprises a safe working system.

In the embodiment of a fluid system 101 as shown in FIG. 2, components of identical function are identified by the same reference numbers as in FIG. 1. In contrast to the embodiment according to FIG. 1, the fluid control valves 106, 107 of the embodiment of the fluid system 101 as shown in FIG. 2 are looped into the fluid lines 111, 112 as individual valves and are in communicating connection with the fluid source 10.

Like in the first embodiment of the fluid system 1 shown in FIG. 1, the control device 3 of the second embodiment of the fluid system 101 shown in FIG. 2 is designed in accordance with a first safety category of a safety standard. Like in the first embodiment shown in FIG. 1, the valve controller 4, the fluid control valves 106, 107 and the monitoring device 23 of the second embodiment shown in FIG. 2 form a safe working system 129 which is designed in accordance with a second safety category of the safety standard, the second category being at a higher level than the safety category of the control device 3.

In the fluid system 101 as shown in FIG. 2, the fluid control valves 106, 107 have a dual function, influencing the fluid flows through the fluid lines 111, 112 both during the regular operation of the fluid system 101 and at any irregularities in the fluid system 101. As a result of this dual function of the fluid control valves 106, 107, the working valves and the working valve controller can be omitted. As a result, however, the fluid control valves 106, 107 are subject to considerably more stringent requirements, because, owing to the very much higher number of load cycles in the normal operation of the fluid system 101, they have to meet the requirements of the safety category which applies to the components of the safe working system 129, therefore involving higher design and manufacturing costs. On the other hand, the monitoring device is capable of diagnosing the correct function of the valve controller and the fluid control valves at each switching operation initiated by the control device, which is also advantageous in the allocation to a safety category.

The fluid system 1 and the fluid system 101 can each be provided with a higher-order safety circuit 37, which in the illustrated embodiment is in communicating connection to the machine controller 32 and the monitoring device 23. The safety circuit 37 has the purpose of monitoring safety-relevant processes in the respective fluid system 1, 101, in particular making use of the sensor signals present at the monitoring device 23. The safety circuit 37 may for example be configured to provide an enable signal to the monitoring device 23 if, on the basis of the received sensor signals and the control signals made available by the control device 3 and/or by the machine controller 32, a non-critical state of the fluid system 1 or 101 respectively is present, in which an intervention of a user in the hazard area 31, for example, can be accepted, because there is no present or imminent movement of the actuator 2. Using this enable signal, the output of a monitoring signal by the monitoring device 23 to the valve controller 4 can be avoided, in order to prevent any undesirable effects on the fluid system 1 or 101 respectively if the user intervention falls into a non-critical time.

In both of the embodiments shown in FIGS. 1 and 2, it can be provided that, for a shutdown of the actuator 2 or its transfer into a safe state, the fluid supply aims at an optional functional state in order to avoid a complete shutdown of the actuator 2, which would be disadvantageous in some cases and could result in consequential damage. In addition or as an alternative, it may also be provided that a sequence of several basic states is provided for a shutdown of the actuator 2 or its transfer into a safe state.

The invention claimed is:

1. A method for operating a fluid system comprising:
controlling a flow of fluid to a fluid controlled actuator with a control device, the control device including a working valve controller and a working valve for supplying fluid to the fluid controlled actuator, the control device defining a first safety category of a safety standard;
determining a state of the fluid controlled actuator using at least one sensor connected to the actuator;
outputting sensor signals corresponding to the determined actuator state from the sensor to a monitoring device;
processing of the sensor signals in the monitoring device;
providing a monitoring signal from the monitoring device to a valve controller at least if no sensor signals are provided by the sensor or if incorrect sensor signals are provided by the sensor;
processing of the monitoring signal in the valve controller as a function of the detected sensor signals; and
operating fluid control valves with the valve controller for influencing the fluid flow between the control device and the actuator, so that the actuator adopts and/or maintains a presettable safe state,
wherein the valve controller, the fluid control valves, the at least one sensor and the monitoring device define a second safety category of the safety standard, the second safety category being at a higher level within the safety standard than the first safety category,
whereby the components which are allocated to the second safety category have a lower probability of failure than the components which are allocated to the first safety category, and
wherein the control device outputs control signals for a programmed operation of the working valves or the fluid control valves, and
wherein the valve controller of the safe working system controls the fluid control valves in such a way that fluid flows to the at least one actuator are influenced such that the actuator can, within a presettable time, be brought into at least one presettable functional state from the group: actuator non-pressurized; fluid flows from and/or to actuator stopped; direction of movement for actuator preset; actuator controlled to standstill; actuator controlled to preset force; pressure in actuator limited without control; actuator clamp activated; speed of actuator movement limited.

2. A method according to claim 1, wherein the monitoring device monitors electric signals of the safety switching means and, if there is an intervention into or an access to a hazard area defined by the actuator, sends a corresponding monitoring signal to the valve controller in order to operate the fluid control valves in such a way that at least one fluid flow to the actuator is influenced, causing the actuator to adopt or maintain a presettable safe state.

3. A method according to claim 2, wherein the monitoring device, if detecting an intervention into or an access to a hazard area defined by the actuator, only sends a corresponding monitoring signal to the valve controller using the signal of the safety switching means, if an imminent state change of the actuator is detected from the output of a control signal of the control device and/or the valve controller, and/or if a state change of the actuator is detected from at least one change of a sensor signal from at least one sensor means.

4. A method according to claim 3, wherein the monitoring device ceases the provision of the monitoring signal as soon as an intervention in and/or access to a hazard area defined by the actuator is no longer detected, and wherein the valve controller, if no monitoring signal is present, does not operate the fluid control valves in a way which deviates from that specified by the control device.

5. A method according to claim 1, wherein the valve controller operates the fluid control valves in such a way that at least one working chamber in the actuator continues to be supplied with pressurized fluid in the presence of a corresponding monitoring signal.

6. A method according to claim 1, wherein the monitoring device monitors electric signals of an operator switching means and adapts the monitoring signal for the valve controller as a function of the detected signal of the operator switching means.

7. A method according to claim 1, wherein control signals of the valve controller for the operation of fluid control valves and sensor signals of the sensor means detected at the actuator are processed in the monitoring device in order to facilitate a check of the safe working system.

8. A method according to claim 1, wherein, in order to reach the safe state, the valve controller or the safe working system operates the fluid control valves in such a way that fluid flows to the at least one actuator are influenced in such a way that the actuator is, within a presettable time, brought into at least one presettable functional state from the group: actuator non-pressurized; fluid flows from and/or to actuator stopped; direction of movement for actuator preset; actuator controlled to standstill; actuator controlled to preset force; pressure in actuator limited without control; actuator clamp activated; speed of actuator movement limited.

9. A method according to claim 8, wherein a time sequence of at least two functional states is preset by the valve controller or by the safe working system.

* * * * *